US012118554B2

(12) United States Patent  
Dunjic et al.

(10) Patent No.: US 12,118,554 B2  
(45) Date of Patent: Oct. 15, 2024

(54) RESTRICTED ITEM ELIGIBILITY CONTROL AT AMBIENT COMMERCE PREMISES

(71) Applicant: The Toronto-Dominion Bank, Toronto (CA)

(72) Inventors: Milos Dunjic, Oakville (CA); David Samuel Tax, Toronto (CA); Jonathan Joseph Prendergast, West Chester, PA (US); Christopher Mark Jones, Villa Nova, PA (US); Thomas Osman Kelly, Wenonah, NJ (US); Asad Joheb, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 180 days.

(21) Appl. No.: 17/683,079

(22) Filed: Feb. 28, 2022

(65) Prior Publication Data

US 2023/0274281 A1 Aug. 31, 2023

(51) Int. Cl.
*G06Q 30/00* (2023.01)
*G06Q 20/18* (2012.01)
(Continued)

(52) U.S. Cl.
CPC ....... *G06Q 20/40145* (2013.01); *G06Q 20/18* (2013.01); *G06Q 30/0601* (2013.01)

(58) Field of Classification Search
None
See application file for complete search history.

(56) References Cited

U.S. PATENT DOCUMENTS 10,345,909 B2 * 7/2019 Levesque ................ G06F 1/163
10,380,816 B2    8/2019 Landers, Jr. et al.
(Continued)

FOREIGN PATENT DOCUMENTS

JP   2019168762   10/2019
WO   2020075837   4/2020
WO   2021220714   4/2021

OTHER PUBLICATIONS

Merged file containing English translation of JP-4243396-B2 and Japanese document (Year: 2009).*

(Continued)

*Primary Examiner* — Naeem U Haq
(74) *Attorney, Agent, or Firm* — Rowand LLP

(57) ABSTRACT

According to an aspect there is provided an ambient commerce system. The ambient commerce system may include a sensor at an ambient commerce premises. The ambient commerce system may include a processor coupled to the one or more sensors. The ambient commerce system may include a memory coupled to the processor. The memory may store processor-executable instructions which, when executed, cause the processor to: detect, based on an output of one or more of the sensors, engagement of an entity with a restricted item; identify the entity; obtain at least a portion of a profile for the entity; determine, based on the at least a portion of the profile for the identified entity, eligibility for the entity to acquire the restricted item; and selectively generate, based on the determined eligibility for the entity, a notification on an electronic device associated with the entity.

22 Claims, 8 Drawing Sheets

(51) Int. Cl.
*G06Q 20/40* (2012.01)
*G06Q 30/0601* (2023.01)

(56) References Cited

U.S. PATENT DOCUMENTS

| | | | |
|---|---|---|---|
| 10,621,560 B1* | 4/2020 | Rickert | H04W 4/60 |
| 11,030,604 B2 | 6/2021 | Kambara et al. | |
| 11,074,632 B2 | 7/2021 | Landers, Jr. et al. | |
| 11,182,803 B2 | 11/2021 | Budano et al. | |
| 11,423,476 B1* | 8/2022 | Kim | G06N 20/00 |
| 11,670,141 B1* | 6/2023 | Zalewski | G06Q 20/327 |
| | | | 705/26.8 |
| 11,783,682 B2* | 10/2023 | Zalewski | G07G 1/0072 |
| | | | 705/26.8 |
| 2005/0137987 A1 | 6/2005 | May et al. | |
| 2008/0265020 A1 | 10/2008 | Copeland et al. | |
| 2011/0316697 A1* | 12/2011 | Krahnstoever | G08B 13/19682 |
| | | | 382/190 |
| 2017/0148005 A1 | 5/2017 | Murn | |
| 2019/0259014 A1 | 8/2019 | Katayama et al. | |
| 2020/0110944 A1 | 4/2020 | Kakino | |
| 2020/0250736 A1 | 8/2020 | Howard et al. | |
| 2021/0117656 A1 | 4/2021 | Garcia | |
| 2021/0182921 A1 | 6/2021 | Onkels et al. | |
| 2021/0366026 A1* | 11/2021 | Brezinski | G06Q 20/18 |
| 2021/0374707 A1 | 12/2021 | Sartori | |
| 2021/0374736 A1* | 12/2021 | Hamid | G06F 21/6218 |

OTHER PUBLICATIONS

Abhaya Asthana et al. "An Indoor Wireless System for Personalized Shopping Assistance", Mobile Computing System and Applications, 1994, pp. 69-74. (Year: 1994).*

USPTO; Final Office Action relating to U.S. Appl. No. 17/684,743 dated Apr. 24, 2024.

* cited by examiner

RESTRICTED ITEM ELIGIBILITY CONTROL AT AMBIENT COMMERCE PREMISES

TECHNICAL FIELD

The present application relates to ambient commerce systems and, more particularly, to systems and computer-implemented methods to control restricted items responsive to a sensed condition at an ambient commerce premises.

BACKGROUND

Ambient commerce systems are sometimes deployed at an ambient commerce premises such as a store to allow customers to skip a traditional checkout process. Often, a customer will tap a credit card or app at a reader when they enter a store and the ambient commerce system monitors which items the customer leaves the store with and then automatically processes a payment for such items. Ambient commerce systems offer a cashier-less checkout experience. In this way, a customer does not have to participate in a traditional checkout process—they simply walk out of the store with any items that are to be purchased.

Ambient commerce systems offer numerous benefits including, for example, reducing the possibility of theft, increasing the speed of checkout, and reducing human resource requirements. However, ambient commerce systems present some challenges for restricted goods such as age-restricted goods since a traditional check-out process is typically required in order to verify a customer's age. Ambient commerce systems typically do not allow for the sale of such restricted items.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
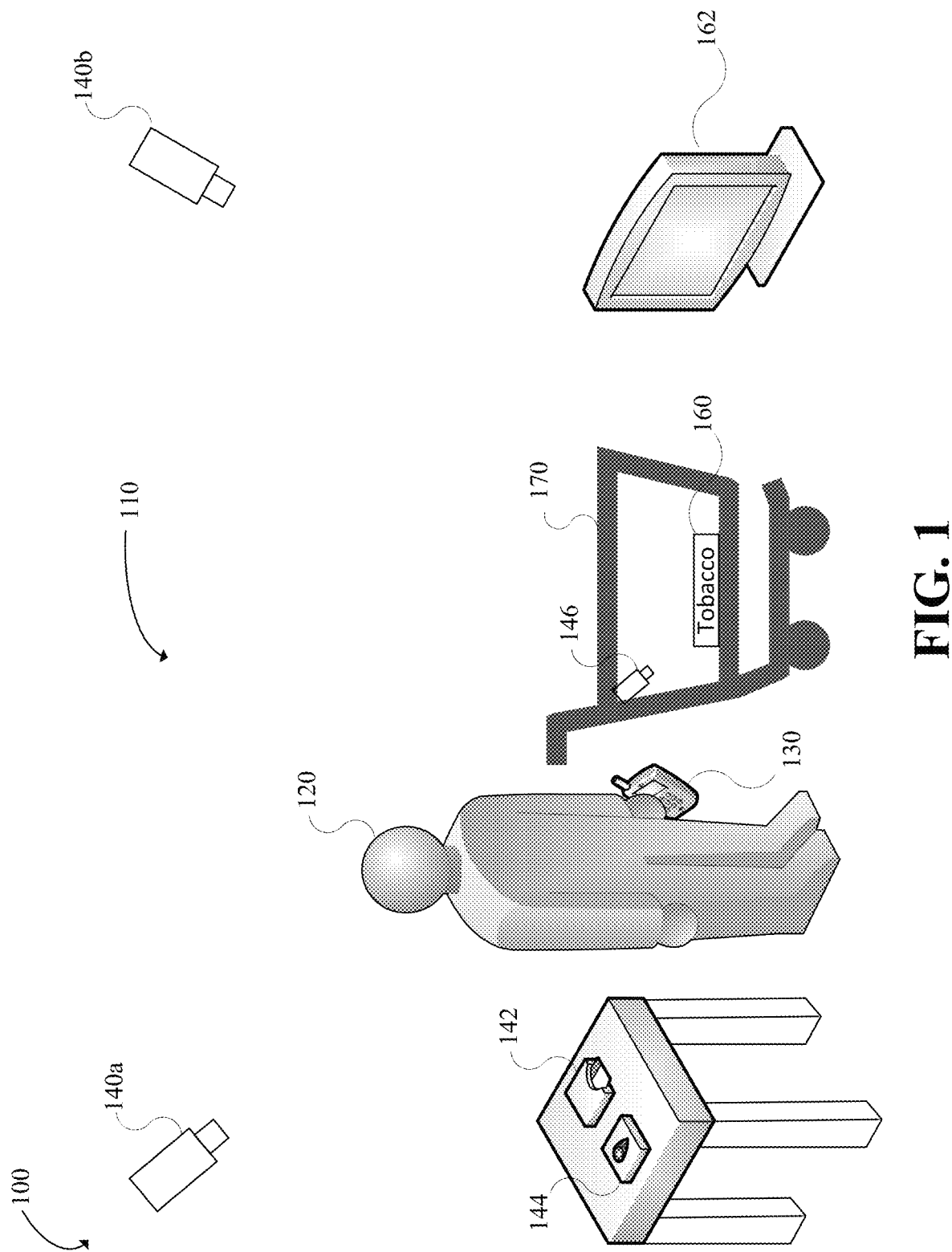
FIG. 1 is a plan view of an ambient commerce system at an ambient commerce premises illustrating an operating environment of an example embodiment.

According to an aspect there is provided an ambient commerce system. The ambient commerce system may include a sensor at an ambient commerce premises. The ambient commerce system may include a processor coupled to the sensor. The ambient commerce system may include a memory coupled to the processor. The memory may store processor-executable instructions which, when executed, cause the processor to: detect, based on an output of one or more of the sensors, engagement of an entity with a restricted item; identify the entity; obtain at least a portion of a profile for the entity; determine, based on the at least a portion of the profile for the identified entity, eligibility for the entity to acquire the restricted item; and selectively generate, based on the determined eligibility for the entity, a notification on an electronic device associated with the entity.

Conveniently, in this way passive age affirmation may be performed using sensors.

In some implementations, detecting entity engagement with a restricted item may include detecting a dwell at a region associated with the restricted item.

In some implementations, detecting entity engagement with a restricted item may include determining that the restricted item has been added to a shopping receptacle associated with the entity.

In some implementations, selectively generating may include, when the entity is ineligible to purchase the restricted item, triggering the notification to indicate ineligibility.

In some implementations, selectively generating may include, when the entity is eligible to purchase the restricted item, triggering the notification to prompt for a secondary identity input.

In some implementations, the secondary identity input may be input at a fingerprint reader on the electronic device.

In some implementations, the secondary identity input may be a voice input at a microphone of the electronic device. The processor may be further configured to compare the voice input to a voiceprint associated with the entity.

In some implementations, selectively generating may include, when the entity is eligible to purchase the restricted item, triggering an offer associated with the restricted item.

In some implementations, the at least a portion of the profile for the entity may be obtained from a financial institution system associated with the entity.

In some implementations, the restricted item may be an age-restricted item.

In another aspect, there is provided a computer-implemented method. The method may include: detecting, based on an output of one or more sensors, engagement of an entity with a restricted item; identifying the entity; obtaining at least a portion of a profile for the entity; determining, based on the at least a portion of the profile for the identified entity, eligibility for the entity to acquire the restricted item; and selectively generating, based on the determined eligibility for the entity, a notification on an electronic device associated with the entity.

In some implementations, detecting entity engagement with a restricted item may include detecting a dwell at a region associated with the restricted item.

In some implementations, detecting entity engagement with a restricted item may include determining that the restricted item has been added to a shopping receptacle associated with the entity.

In some implementations, selectively generating may include, when the entity is ineligible to purchase the restricted item, triggering the notification to indicate ineligibility.

In some implementations, selectively generating may include, when the entity is eligible to purchase the restricted item, triggering the notification to prompt for a secondary identity input.

In some implementations, the secondary identity input may be input at a fingerprint reader on the electronic device.

In some implementations, the secondary identity input may be a voice input at a microphone of the electronic device. The method may further include comparing the voice input to a voiceprint associated with the entity.

In some implementations, selectively generating may include, when the entity is eligible to purchase the restricted item, triggering an offer associated with the restricted item.

In some implementations, the at least a portion of the profile for the entity may be obtained from a financial institution system associated with the entity.

In some implementations, the restricted item may be an age-restricted item.

In another aspect, there is provided a computer-readable storage medium. The computer-readable storage medium may be a non-transitory computer-readable storage medium. The computer-readable storage medium may have stored thereon instructions which, when executed, configure a processor and/or a computer system to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

Systems and methods for providing identity data to remote computer systems using a payment network are described below.

FIG. 1 is a plan view of an ambient commerce system 100 at an ambient commerce premises 110. The ambient commerce premises 110 may be a merchant location such as a store. The store may be a bricks-and-mortar establishment at which a customer may physically attend to shop. By way of example, the store may be or include any one or more of a grocery store, a department store, a clothing store, a thrift shop, a sporting goods store, a big box store, a pet store, a discount store, a warehouse store, a convenience store, or a store of another type.

The ambient commerce system 100 may be referred to as a cashier-less checkout system, an ambient checkout system, a "just-walk-out" system or "grab and go" system. The ambient commerce system 100 includes one or more sensors which are used by the ambient commerce system to identify one or more items 160, 162 that are sold at the ambient commerce premises 110 and that are being purchased by an entity 120 such as a customer who is on site at the ambient commerce premises 110.

The items may be or include any products. By way of example, the items 160, 162 that are available for purchase via the ambient commerce system 100 may be or include groceries, electronic goods, sporting goods, accessories, clothing, or goods of another type. One or more of the items may be a restricted item, such as an age-restricted item. By way of example, the age-restricted item may be a tobacco item such as cigarettes or chewing tobacco, a lottery item such as a lottery ticket, 50/50 ticket or scratch ticket, an alcohol product such as beer, wine or spirits, or a cannabis product such as a smokeable cannabis product, edible cannabis product, or an oil.

Restricted products may also be or include other types of restricted products. For example, any product that is not available to all customers may be a restricted product (which may also be referred to herein as a restricted item) for the purpose of this document. In some implementations, a restricted product may be a product that is a limited quantity product and which a merchant has elected to restrict the sale to only customers satisfying defined criteria.

The ambient commerce system 100 may include various sensors. One or more of the sensors may be on site at the ambient commerce premises 110. The sensors may generate respective sensor outputs which are used by the ambient commerce system 100 to facilitate ambient commerce. For example, the sensors may be or include one or more cameras 140*a*, 140*b*. The cameras may be located at various regions throughout the ambient commerce premises 110. In some implementations, the cameras 140*a*, 140*b* are part of a camera array or camera grid. The camera array or grid may provide complete or near complete coverage of all areas of the ambient commerce system 100 and the cameras may be configured to provide some overlap in camera coverage. In some implementations, each of the cameras may include multiple image sensors or the cameras may be configured in multiples such as pairs to enable the ambient commerce system 100 to determine and evaluate depth information as part of its analysis.

The sensors may include a receptacle contents detector 146. The receptacle contents detector 146 may be provided on or associated with a particular shopping receptacle 170. The particular shopping receptacle 170 is a container or other receptacle which may be used for holding or transporting goods while shopping. The particular shopping receptacle may, for example, be a shopping cart, shopping basket, shopping bag, or shopping bin.

The receptacle contents detectors 146 may be or include any one or more of: a camera, a barcode reader, a quick response (QR) code reader, a wireless tag reader such as a radio frequency identifier (RFID) reader or a sensor of another type.

In some implementations, one or more of the items that may be available for purchase may include a physical feature which facilitates identification of that item by one of the sensors. By way of example, the items may include a barcode which may be scanned by a barcode reader or camera, a QR code which may be scanned by a QR code reader or scanner, and/or a wireless tag such as an RFID tag.

The sensors included in the ambient commerce system 100 may include other types of sensors and readers including, for example, a biometric reader 144 and/or a token reader 142. The biometric reader 144 and/or the token reader 142 may be identity sensors. Identity sensors are sensors that are used to verify the identity of an entity 120. That is, identity sensors may be used to associate an entity 120 on the ambient commerce premises 110 with a profile or account.

The biometric reader 144 may be or include a fingerprint sensor, a facial recognition sensor, a retina scanner, or a sensor of another type. The token reader 142 may be a physical card reader such as a payment card reader including a credit card reader or debit card reader. In some implementations, the token reader 142 may be or include a near field communication (NFC) reader. The token reader 142 may be configured, in some implementations, to wirelessly read a token which may be stored on an electronic device 130 associated with an entity 120 or which may be stored on a physical card.

The sensors included in the ambient commerce system 100 may also include a microphone. The microphone may be used, for example, to verify the identity of an entity using a voiceprint. That is, the microphone may be used as an identity sensor.

The sensors included in the ambient commerce system 100 may be or include a gaze detection sensor. The gaze detection sensor may be or include one or more cameras. The gaze detection sensor may be an eye gaze detection sensor. The gaze detection sensor may be used to identify at item that the entity 120 is currently looking at. The gaze detection sensor may detect where the entity 120 is looking by identifying a portion of an ambient commerce premises 110 being looked at from an angular direction of a head and/or eyes. In some implementations, the gaze detection sensor may be configured to identify a gaze vector and an item may be identified if it is in a direction associated with the gaze vector.

The ambient commerce system 100 may be configured to detect the identity of an entity 120 and/or items 160, 162 that are being purchased using any one of a number of techniques. For example, in some implementations, identity may be detected using an identity sensor. For example, the biometric reader 144 and/or token reader 142 and/or one or more of the cameras 140*a*, 140*b* may be used to determine identity of an entity when the entity enters the ambient commerce premises 110. By way of example, in some implementations, upon entering the ambient commerce premises, the entity 120 may tap their electronic device at a token reader 142 which may then read a token from the electronic device which uniquely identifies the customer. In some implementations, multiple authentication techniques may be used to verify the identity of the customer. For example, the ambient commerce system may use two or more of: facial recognition; token acquisition and verification; retinal scanning; fingerprint scanning; and voiceprint scanning.

Further, in some implementations, identity of an entity 120 may be determined or verified using a shared secret such as a personal identification number (PIN) or secret code or phrase. The ambient commerce system 100 may include an input device for receiving input of the shared secret from an entity 120.

In some implementations, the ambient commerce system 100 may include or operate in cooperation with an electronic device 130 associated with an entity 120. The electronic device 130 may be a portable electronic device such as a smartphone, smartwatch or other wearable electronic device. The electronic device 130 may, in some implementations connect with the ambient commerce system 100 when it is within a geolocation or geofence associated with the ambient commerce system 100. For example, when the electronic device 130 is at the ambient commerce premises, it may connect with the ambient commerce system 100. Such communication may be performed via a long or short range communication protocol. In some implementations, the electronic device 130 may have an ambient commerce application stored thereon which is configured to enable the electronic device 130 to communicate with the ambient commerce system 100.

In at least some implementations, the electronic device 130 may be used to identity an entity 120. For example, the electronic device 130 may share its location (as determined from a location subsystem such as a GPS subsystem) with the ambient commerce system 100. The ambient commerce system 100 may determine that a particular entity 120 is on site at the ambient commerce premises when the location of that entity's electronic device is within a geofence defined for the ambient commerce premises. Additionally or alternatively, in some implementations the electronic device 130 may connect to the ambient commerce system 100 via a short range communication protocol such as NFC, Bluetooth™, WiFi, or a short range communication protocol of another type. In such implementations, the ambient commerce system may determine that a particular entity 120 is on site at the ambient commerce premises when the location of that entity's electronic device is in communication range of a short-range communication system associated with the ambient commerce premises.

In some implementations, the ambient commerce system 100 may use a biometric sensor associated with an entity's electronic device to further verify that a particular entity 120 is at the ambient commerce premises. For example, the ambient commerce system may, when the electronic device is determined to be on site, cause the electronic device to prompt the entity for input of a shared secret or a biometric such as a fingerprint. In this way, the ambient commerce system determines that the electronic device is on site and is being used by a particular entity 120. This may, for example, prevent a fraudster from circumventing the ambient commerce system by stealing another person's electronic device.

The electronic device 130 associated with an entity 120 may be used for other purposes instead of or in addition to identification and customer detection. For example, the electronic device 130 may include an output interface such as a display screen or speaker and the output interface may be used for outputting notifications generated by the ambient commerce system or by another system associated with the ambient commerce system.

In some implementations, the ambient commerce system 100 may perform a computer operation in response to detecting engagement of the entity with a restricted item. For example, the ambient commerce system 100 may output a notification on an electronic device 130 associated with an entity or may output notifications on an electronic device associated with an in-store representative. In some implementations, the ambient commerce system 100 may control an electrically controlled exit prevention device such as an electrically controlled gate associated with an exit for the ambient commerce premises as a direct result of the determination that the entity is engaged with a restricted item. The electrically controlled gate may be, for example, an electrically controlled turnstyle.

Engagement may be detected based on the output of one or more of the sensors. By way of example, engagement may be detected when the ambient commerce system determines, based on the output of a sensor such as a camera 140*a*, 140*b*, that an entity has dwelled within a geofence associated with a first item. By way of further example, engagement with an item may be detected when the ambient commerce system determines, based on the output of a sensor such as a receptacle contents detector 146, that the item has been added to a shopping receptacle. By way of further example, engagement with an item may be detected based on gaze. For example, when the ambient commerce system determines that the entity is looking at the item, which may be determined from the output of a gaze detection sensor, it may determine that the customer is engaged with the item.

Figure 2:
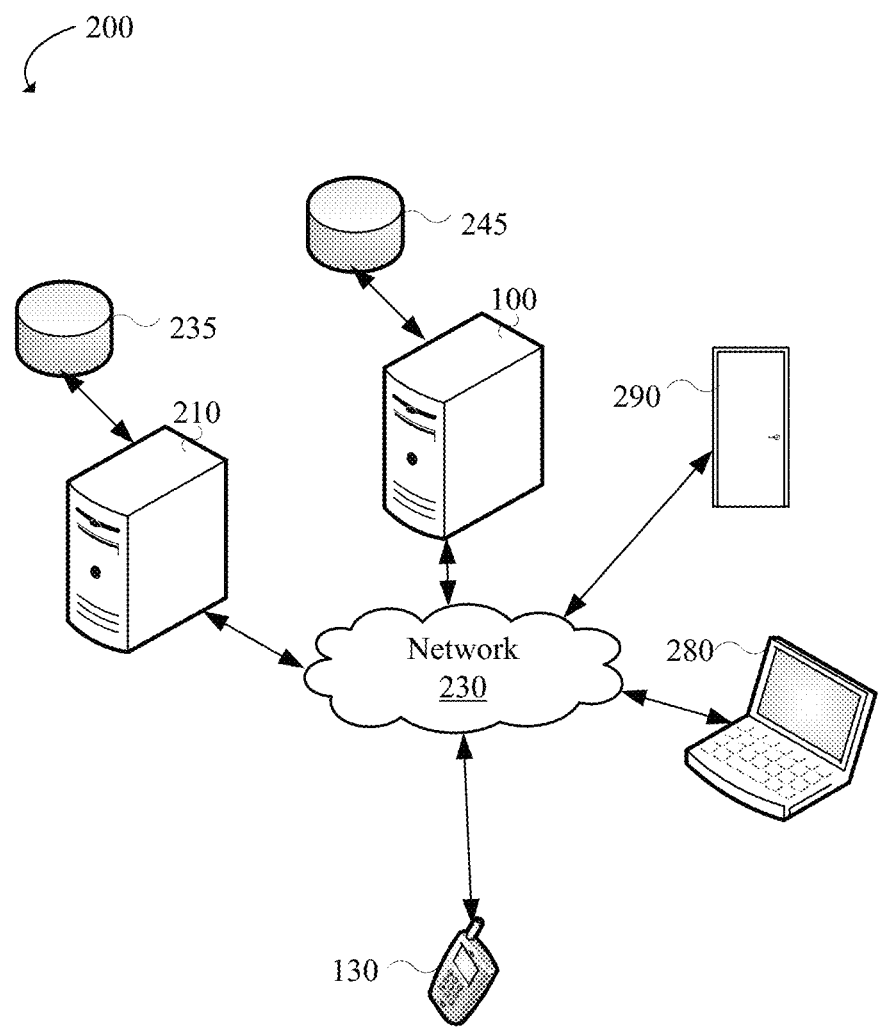
FIG. 2 is a schematic operation diagram illustrating an operating environment.

FIG. 2 is a schematic operation diagram illustrating an operating environment of an example embodiment. FIG. 2 illustrates a system 200 which may be or include an ambient commerce system 100. The ambient commerce system 100 may be of the type described above with reference to FIG. 1, or a variation thereof. The ambient commerce system 100 may be or include a computer system. The computer system may be coupled with one or more sensors, as described with reference to FIG. 1 and may receive sensor output from such sensors.

The system 200 may also include an electronic device 130. The electronic device 130 may be as described above with reference to FIG. 1. For example, the electronic device 130 may be associated with an entity, such as a customer. The electronic device 130 may also be a computer system.

The electronic device 130 may be in communication with the ambient commerce system 100. Such communication may be via a direct connection or it may be an indirect connection. An indirect connection may be a connection that relies upon other intermediary computers or systems to relay messages. For example, as illustrated in FIG. 2, the ambient commerce system 100 and the electronic device 130 may be coupled to and communicate with one another via a network 230. The network 230 may be of various types. The network 230 may be a computer network. In some embodiments, the computer network may be an internetwork and may be formed of one or more interconnected computer networks. For example, the computer network may be or may include an Ethernet network, an asynchronous transfer mode (ATM) network, a wireless network, a telecommunications network or the like.

In some implementations, at least some communications between the electronic device 130 and the ambient commerce system 100 may occur over a direct connection. A direct connection may be a local communication method which may not require a network. For example, example direct connections include NFC, WiFi, and Bluetooth.

The ambient commerce system 100 may be or include a resource server 210. The resource server 210 may track, manage, and maintain resources, adjudicate lending requests, and/or lend resources for a plurality of entities. For example, resources available for a plurality of entities may be specified in account data for such entities. The resources may, for example, include computing resources, such as memory or processor cycles. By way of further example, the resources may include stored value, such as fiat currency, which may be represented in one or more databases. For example, as shown in FIG. 2, the resource server 210 may be coupled to a database 235, which may be provided in secure storage. The secure storage may be provided internally within the resource server 210 or externally; the secure storage may, for example, be provided remotely from the resource server 210. In some embodiments, the secure storage may include one or more data centers. The data centers may, for example, store data with bank-grade security.

The resource server 210 may include a resource request processing engine (not shown in FIG. 1). A resource request processing engine may be implemented to automatically process resource transfer requests that are received at a resource server. Specifically, the resource request processing engine may be configured to process requests to transfer resources that are associated with one or more resource accounts managed by the resource server. The resource request processing engine may process resource transfer requests in accordance with defined handling actions. For example, the resource request processing engine may be configured to automatically process resource transfer requests without manual intervention by related entities for the resource transfer requests.

The database 235 includes account data for a plurality of accounts associated with a plurality of entities. For example, the database 235 may include records for a plurality of accounts and at least some of the records may define a quantity of resources associated with an entity. For example, the entity that is associated with the electronic device 130 (which may also be referred to as a client device or customer device) may be associated with a resource account having one or more records in the database 235. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance. In some implementations, a record for an account may be or include a resource parameter or enable the determination of a resource parameter. A resource parameter may, for example, indicate whether a particular entity associated with an account has access to a resource. In some implementations, the resource parameter may specify whether the particular entity associated with the account has access to a borrowed resource. In some implementations, the resource parameter may indicate a resource balance. The balance may be a balance associated with owned or borrowed resources.

The database 235 may also include identity verification data for entities having accounts in the database 235. The identity verification data may be or include a shared secret and/or biometric data such as a fingerprint, voiceprint and/or facial profile data. In at least some implementations, the resource server 210 may share at least some of the identity verification data with the ambient commerce system 100 to assist with verifying identity of an entity at an ambient commerce premises 110. In other implementations, rather than share the identity verification data itself, the resource server 210 may, instead, perform identity verification for the ambient commerce system and may confirm to the ambient commerce system the identity of an entity.

The database 235 may also include profiles for a plurality of entities. A profile may also be referred to as profile data and such data may be part of the account data, for example. A profile may be or include biographical data associated with an entity. By way of example, the profile may be or include an age identifier for the entity, such as an age or date of birth. By way of further example, the profile may be or include other information about the entity such as residential information (including, for example, a city of residence, country of residence, etc.), income information (such as an annual income), past spending or shopping information, or information about products associated with the entity (such as whether the entity has a particular credit card or information about whether the entity is a subscriber to a particular service, or information about whether is a member of a particular loyalty program).

The resource server 210 may, for example, be a financial institution system and the entity associated with an electronic device 130 may be a customer of a financial institution operating the financial institution system.

The resource server 210 may be or include a computer system. The resource server 210 may be in communication with the ambient commerce system 100. In the illustrated example, the resource server 210 is in communication with the ambient commerce system 100 via the network 230.

As illustrated in FIG. 2, the ambient commerce system 100 may also include or be connected to a datastore 245 such as a database. The datastore 245 may be or include an inventory tracking data store. In some implementations, the datastore 245 may include product data for one or more items that are physically present in the ambient commerce premises 110. By way of example, the datastore 245 may include one or more parameters associated with items available at the ambient commerce premises 110. Such parameters may be referred to as item parameters. Example item parameters may be or include a value parameter and/or a class parameter. A value parameter may be an indicator of a cost or price of an item. Put differently, the value parameter for an item may represent an amount of resources required to transfer ownership of the item to an entity. The value parameter may, in some implementations, be expressed in units of currency, such as in dollars, Euros, Francs, etc.

A class parameter may define a category or classification that an item belongs to and it may also be referred to as a category parameter. The category may represent a type of the item. By way of example, example categories may include any one or a combination of: consumer electronics, televisions, sporting goods, bicycles, financeable products, clothing, grocery items, etc.

In some instances, a particular item may be associated with multiple class parameters. By way of example, an item may be associated with a broad class parameter that defines a broad category of the item (e.g., consumer electronic) and a narrow class parameter that defines a narrow category of the item (e.g., television). In some implementations, the class parameter(s) for an item may be or include a binary class parameter. A binary class parameter is a class parameter that operates as a flag which defines whether the item is or is not a particular type of good associated with that class parameter. By way of example, a binary class parameter may indicate whether an item is financeable. In some implementations, a financeable item may be an item that is available for purchase using a buy now pay later feature.

The class parameter(s) for an item may also be or include a brand parameter. A brand parameter indicates a brand associated with the item. The brand may be a manufacturer of the item. The brand may be a brand that is reflected on packaging associated with the item.

The product data in the datastore 245 may include restriction data. The restriction data identifies at least one product whose purchase is restricted. That is, it may identify items that are restricted items. The restriction data, in some implementations, includes binary restriction data. Binary restriction data operates as a flag which defines whether the item is or is not restricted. The restriction data may also be or include non-binary restriction data. The non-binary restriction data may, for example, define a nature of a restriction. By way of example, in some implementations, a particular item may be an age-restricted item. In such implementations, the restriction data may specify a requisite age for the item. The requisite age may be a legal minimum age required for purchase of the product in a jurisdiction associated with the ambient commerce system 100. In other implementations, an item may be restricted on another basis. By way of example, it may be that the item is only available for purchase if a customer resides in a certain jurisdiction. By way of example, some products may not be available to purchase for out-of-jurisdiction purchasers. By way of further example, some products may only be available for purchase through a promotion and it may be that a customer needs to have a particular credit card or loyalty program or other service or subscription in order to purchase the item. Restriction data may define any one or more restrictions of the type defined above or elsewhere in this document.

The datastore 245 or another datastore may also include item identification data. The item identification data may be data that is used by the ambient commerce system to identify an item in the ambient commerce premises. By way of example, in a system that relies upon a code such as a barcode or QR code for identification of items, the item identification data may include a representation of the code for a particular item. By way of further example, in a system which relies upon packaging identification, the item identification data may include information about the packaging of an item. By way of further example, in a system that relies upon in-store placement information to identify items, the item identification data may include information defining a location within the ambient commerce premises at which a particular item is located. By way of example, the in-store placement information may specify an aisle number, region number, shelf number, etc. and such numbers (or other identifiers) may be known to the ambient commerce system so that the ambient commerce system is able to identify the particular items available at various regions of the ambient commerce premises.

By way of further example, in a system which relies upon a tag such as an RFID tag, the item identification data may specify a number or other identifier associated with the tag.

The ambient commerce system 100 may also include or be connected to an electronic device 280 associated with an in-store operator. The in-store operator may be an employee of a merchant operating the ambient commerce premises, for example. The electronic device 280 associated with the in-store operator may be of a type that is the same or similar to the electronic device 130 associated with the entity. By way of example, the electronic device 280 may be a laptop or desktop computer, a mobile computing device such as a smartphone, a smart watch or other wearable or an electronic device of another type. The electronic device 280 associated with the in-store operator may communicate with the ambient commerce system 100 by way of a network 230.

The ambient commerce system 100 may also include or be connected to an electrically controlled exit prevention device 290 such as an electrically controlled gate or door associated with an exit for the ambient commerce premises. The electrically controlled exit prevention device 290 may be controlled to prevent the entity from leaving the ambient commerce premises with a restricted item when the entity has not demonstrated eligibility to purchase the age-restricted item. In some implementations, the electrically controlled exit prevention device 290 may be or include an electrically controlled lock. In some implementations, the electrically controlled exit prevention device 290 may be or include an automatic door which may be controlled to disable opening of the door to prevent exit by an entity.

Figure 3:
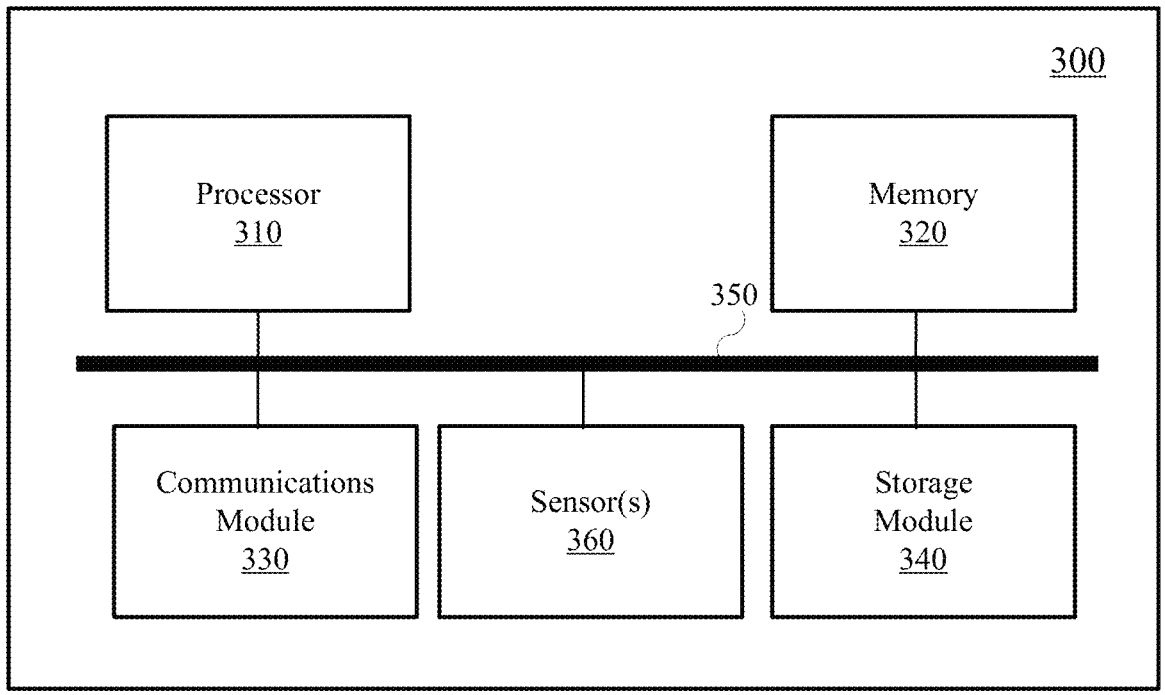
FIG. 3 is a high-level schematic diagram of an example computer device.

Referring now to FIG. 3, a high-level operation diagram of an example computer device 300 is shown. In some embodiments, the computer device 300 may be exemplary of one or more of the ambient commerce system 100, the electronic device 130, the electronic device 280 and/or the resource server 210.

The example computer device 300 includes a variety of modules. For example, as illustrated, the example computer device 300 may include a processor 310, a memory 320, a communications module 330, and/or a storage module 340.

As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application. The communications module may, in various implementations, be one or more of: a communications device, a communications interface, a communications chip, and/or a transceiver.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persistent storage other than the persisted storage (if any) accessible via the memory 320. In some embodiments, the storage module 340 may be used to store and retrieve data in a database. A database may be stored in persistent storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access remotely stored data using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

When the computer device 300 is exemplary of the ambient commerce system 100 or, in at least some implementations, the electronic device 130, the computer device may include one or more sensors 360. The one or more sensors 360 may be or include any one or more of the sensors described above with reference to FIG. 1.

Figure 4:
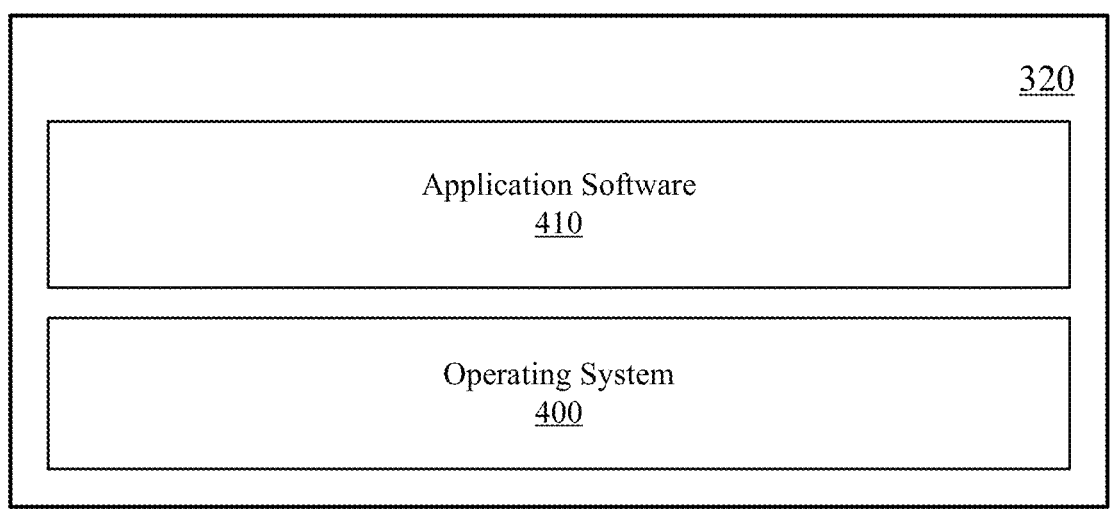
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the ambient commerce system 100, the resource server 210 and/or the electronic device 130.

While a single application 410 is illustrated in FIG. 4, in operation the memory 320 may include more than one application 410 and different applications 410 may perform different operations.

Figure 5:
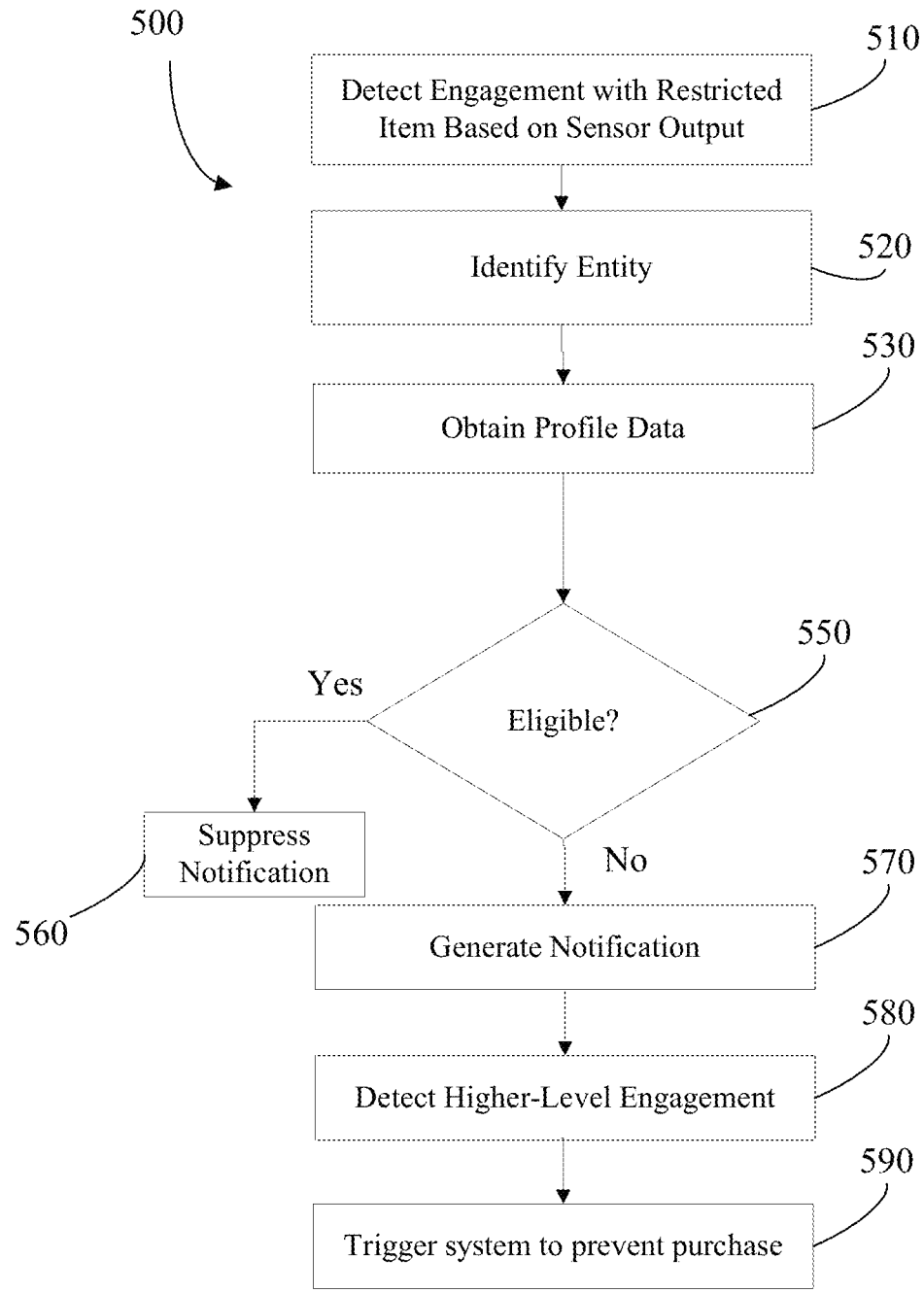
FIG. 5 is a flowchart showing operations performed by a computer system in providing a notification at an electronic device associated with an entity.

FIG. 5 is a flowchart showing operations performed by a system 200, such as the ambient commerce system 100 (FIGS. 1 and 2) and/or the resource server 210 (FIG. 2). The operations may be included in a method 500 which may be performed by the ambient commerce system 100 (FIGS. 1 and 2) and/or the resource server 210 (FIG. 2). For example, computer-executable instructions stored in memory of the ambient commerce system 100 (FIGS. 1 and 2) and/or the resource server 210 (FIG. 2) may, when executed by one or more processors of the ambient commerce system 100 (FIGS. 1 and 2) and/or the resource server 210 (FIG. 2), configure the ambient commerce system 100 (FIGS. 1 and 2) and/or the resource server 210 (FIG. 2) to perform the method 500 or a portion thereof.

At operation 510, the method 500 includes detecting, based on an output of one or more sensors, engagement of an entity with a restricted item. The sensors may be sensors provided at a merchant location such as an ambient commerce premises. The sensors may be of the type described above with reference to FIG. 1. By way of example, in some implementations, the sensors may include a gaze detection sensor which identifies when the entity is looking at the restricted item. That is, engagement may be identified based on gaze. When the entity is looking at the restricted item, the system performing the method 500 may determine that the entity is engaged with the restricted item.

Other techniques for identifying engagement may also be used. By way of example, in some implementations, entity engagement with a restricted item may be detected by detecting a dwell at a region associated with the restricted item. For example, entity engagement with the restricted item may be determined to have occurred when a dwell of an entity is detected in a geofence for the restricted item. A dwell may be detected, for example, when the entity has not substantially moved for at least a threshold period of time. The threshold period of time may be a period of time that suggests that the entity is browsing; that is, contemplating a purchase. In other implementations, the dwell may be detected if it is determined that the entity has remained in the geofence for the restricted item for at least a threshold period of time. By way of example, the geofence may be or include a particular aisle or region or a portion thereof within an ambient commerce premises. The geofence may be an area of the ambient commerce premises in which restricted items are located. In some instances, a dwell may be detected based on a sensor such as a camera 140*a*, 140*b*.

In another example of a technique that may be used to identify engagement with the restricted item, the ambient commerce system 100 may identify engagement with the restricted item when it detects that the entity has picked up the restricted item. The picking up of an item may be detected using a sensor output of a camera 140*a*, 140*b*, for example.

In another example of a technique that may be used to detect engagement with the restricted item, the ambient commerce system 100 may identify engagement with the restricted item when the restricted item is added to a shopping receptacle 170 associated with the entity, such as a shopping receptable in use by the entity. The ambient commerce system 100 may identify that the restricted item has been added to a shopping receptacle 170 based on the output of a receptacle contents detector 146 and/or based on the output of a camera 140*a*, 140*b*.

In another example of a technique that may be used to detect engagement with the restricted item, the ambient commerce system 100 may identify engagement with the restricted item based on detected browsing activity of the entity with the restricted item. By way of example, engagement may be detected when the entity is determined to have examined a price tag for the restricted item. By way of further example, engagement may be detected when the entity is determined to have contacted (e.g., touched) the restricted item. These types of engagement may be detected based on the output of a camera 140*a*, 140*b*.

At the operation 510, the system 200 performing the method 500, such as the ambient commerce system 100, may determine that an item being engaged by the entity is a restricted item. A restricted item is an item of the type described above. By way of example, the restricted item may be an age restricted item. An age-restricted item is an item that is only available for purchase by purchasers satisfying defined age criteria. The age criteria may, for example, include a threshold. The threshold may be, for example, a minimum age required to purchase the age-restricted item. By way of example, the age-restricted item may be a tobacco item such as cigarettes or chewing tobacco, a lottery item such as a lottery ticket, 50/50 ticket or scratch ticket, an alcohol product such as beer, wine or spirits, or a cannabis product such as a smokeable cannabis product, edible cannabis product, or an oil.

In some implementations, it may be that the age-restriction for an item has a maximum age defined for purchase. Such a restriction may be implemented, for example, where the item is only available in limited quantities and the merchant associated with the premises wishes to restrict the item to a target demographic; such as children. Or, it may be that the item is a "junior" item which requires a customer to be under a particular age; e.g., under 18.

Restricted items may also be or include other types of restricted items, apart from age-restricted items. For example, a product may be restricted based on any one or more of: geographic location associated with a purchaser (e.g., to prevent purchasers who are not associated with a particular geographic region from making a purchase), an associated service or subscription (e.g., to only allow a purchase if a purchasing entity has a particular service or subscription such as a particular credit card, loyalty program, or subscription). By way of example, it may be that a promotion may only allow purchases to be made by customer that are members of a particular service, such as an automobile association. By way of further example, it may be that a product is restricted based on income; for example, the product may only be offered if a purchasing entity's income is less than a threshold.

At the operation 510, the system 200 may determine whether an item being engaged is a restricted item based on product data in a datastore 245. For example, as noted above in the discussion of FIG. 2, the product data may include restriction data. Such restriction data may define whether an item is restricted and the nature of any restrictions placed on the item.

Referring still to FIG. 5, the method 500 may include, at operation 520, identifying the entity that is engaged with the restricted item. Identification of the entity may be performed using one or more of the identification techniques described above, particularly with reference to FIG. 1. By way of example, in some implementations, the identification may be performed using an identification sensor such as a biometric reader 144 or a token reader 142. By way of further example, identification may be performed using facial recognition, voice recognition, shared secret verification and/or detection of an electronic device 130 associated with the entity 120 at the ambient commerce premises. In some implementations, the identification operation 520 may be performed prior to the detection of engagement with the restricted item at operation 510. For example, in some implementations, the identification operation 520 may be performed, in part, upon entry into the ambient commerce premises. Then, the system 200 such as the ambient commerce system 100 tracks that entity as they move through the ambient commerce premises. Such tracking may, for example, rely on the cameras 140*a*, 140*b*.

In some implementations, the identification of the entity 120 may be performed by or with data or processing resources associated with a resource server 210. For example, a resource server may include a representation of a voiceprint, fingerprint or face, or it may include a stored shared secret that is known to the entity 120 and that may be used to identify the entity.

At an operation 530, the system 200 may obtain at least a portion of a profile for the identified entity. In some implementations, the at least a portion of the profile for the entity is obtained from a financial institution system associated with the entity. For example, the profile, or a portion thereof, may be obtained from a resource server 210 that is associated with the entity. The resource server 210 that is associated with the entity may be identified in various ways. For example, it may be that the resource server 210 is associated with an entity profile stored for an identified entity at the ambient commerce system 100. For example, the ambient commerce system 100 may identify the entity using its own identification data and it may then engage the particular resource server 210 that is defined in a datastore for that entity. In other implementations, the identification of the resource server 210 may be performed when the entity provides an input to the ambient commerce system 100 which identifies the resource server 210. By way of example, in an implementation in which a token reader 142 is used for identification of an entity, the particular token used may identify the resource server 210 that is associated with the entity.

Where the system 200 obtains the profile, or portion thereof, from a resource server 210, the system may provide, to the resource server 210 unique identifying information. The unique identifying information may be information that uniquely identifies the entity. The unique identifying information may be obtained, by the ambient commerce system 100 from an entity profile associated with the identified entity.

The at least a portion of the profile may include biographical data or an indicator of biographical data. By way of example, the at least a portion of the profile may be or include an age identifier for the entity, such as an age or date of birth. By way of further example, the profile may be or include other information about the entity such as residential information (including, for example, a city of residence, country of residence, etc.), income information (such as an annual income), past spending or shopping information, or information about products associated with the entity (such as whether the entity has a particular credit card or information about whether the entity is a subscriber to a particular service, or information about whether is a member of a particular loyalty program).

Next, at an operation 550, the system 200 performing the method 500, such as the ambient commerce system 100, determines, based on the at least a portion of the profile for the identified entity, eligibility for the entity to acquire the restricted item. By way of example, where the restricted item is an age-restricted item that has an age restriction, the system 200, such as the ambient commerce system 100 may determine, based on the profile or portion thereof, whether the entity complies with the age restriction. In some implementations, the determination may include a comparison to a threshold. By way of example, in some implementations, the system 200 may determine that the entity complies with the age restriction if their profile indicates that an age of the entity exceeds the threshold.

As noted previously, other restrictions may be in place for an item instead of or in addition to age restrictions. For example, a geographical restriction may be assessed based on a geographical location in the profile, an income restriction may be assessed based on an income specified in the profile, a past spending or shopping restriction may be assessed based on past spending behaviour in the profile, and/or a member, service or subscription-based restriction may be assessed by determining, based on the profile, whether the entity is associated with a requisite organization, service or subscription.

Based on the determined eligibility for the entity, a notification may be selectively generated. The notification may be generated on an electronic device 130 associated with the entity.

In the example illustrated in FIG. 5, when the entity is ineligible to purchase the restricted item (as determined at the operation 550), the notification is triggered (at an operation 570) to indicate ineligibility. That is, the notification is generated in response to determining that the entity that is engaged with the restricted item is not eligible to purchase the restricted item.

In the example of FIG. 5, if instead the system 200 determines at the operation 550 that the engaged entity is eligible to purchase the restricted item, the notification may be supressed at an operation 560. That is, no notification may be triggered in some implementations in response to determining that the entity is eligible to purchase the restricted product.

Figure 6:
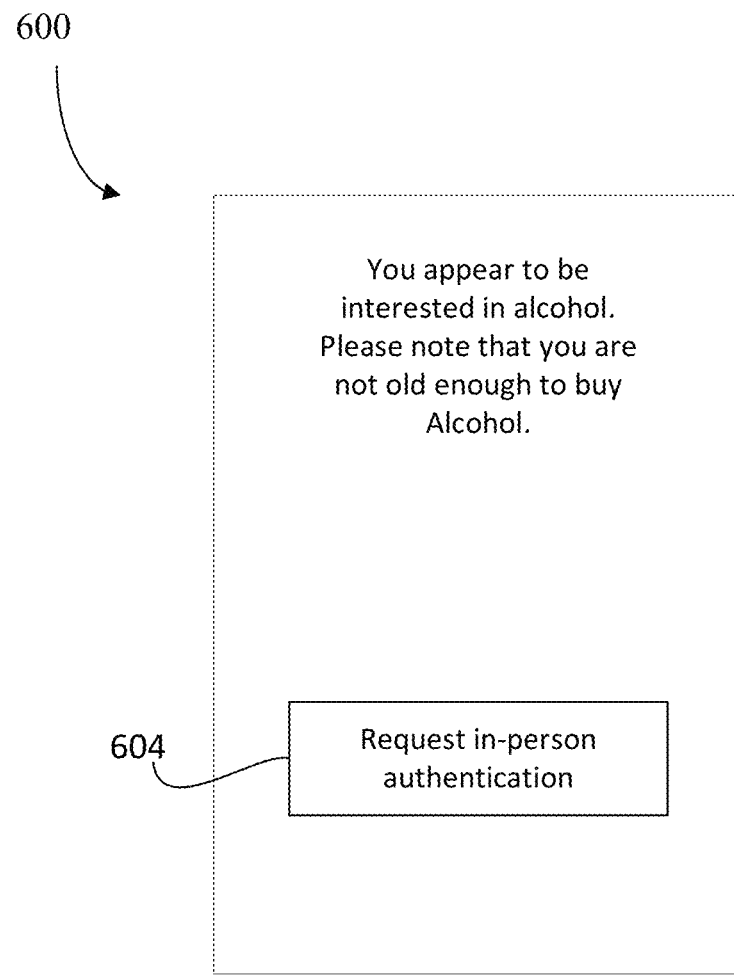
FIG. 6 is an example notification in accordance with example embodiments.

Referring briefly to FIG. 6, an example notification 600 is illustrated. The notification includes an indication that the entity is not eligible to acquire the restricted item. It may be that the notification includes a selectable option 604 to request a re-determination of eligibility. Selection of the option may, for example, cause a secondary verification process to be initiated. In some implementations, the secondary verification process may be initiated by sending a message to a computer system such as and electronic device 280 associated with an in-store operator.

The notifications that are generated herein may be generated on an output device such as a display, in the case of visual notifications, and a speaker, in the case of audible notifications. Notifications may take other forms.

As noted above, the notification may be generated at an electronic device 130 associated with the entity 120 that is engaged with the restricted item. Device identification data stored in an entity profile may, in some implementations, be used by the ambient commerce system 100 to generate the notification on the electronic device 130. The device identification data may uniquely identify the electronic device 130.

In some implementations, the notifications generated on an electronic device may be generated using an application stored on the electronic device, such as an ambient commerce application.

In some implementations, after the notification has been generated, the system 200, such as the ambient commerce system 100 may continue to monitor engagement of the entity 120 with the restricted item or with other restricted items. If the ambient commerce system 100 determines that the entity remains engaged with the restricted item, then it may perform further computer operations to attempt to prohibit the entity from acquiring in the restricted item.

In some implementations, at an operation 580, after the notification has been generated on the electronic device, the system 200 may detect further or a higher-level engagement with the restricted item. Detecting further engagement may involve detecting engagement using any of the techniques described above with respect to operation 510. Detecting higher-level engagement may involve detecting a type of engagement that is considered to be more engaging than a type of engagement detected at the operation 510. By way of example, it may be that the engagement that was detected at the operation 510 was a gaze in the direction of the restricted item. Any one or more of the following may be considered to be higher-level engagements than the gaze: picking up the restricted item, adding the restricted item to a shopping receptable, or touching the restricted item. Similarly, if the engagement detected at the operation 510 was touching or lifting the item, then placing the item in a shopping receptacle may be considered to be a higher-level engagement.

When further engagement or, in some implementations, higher-level engagement is detected, then at an operation 590, the system 200 may trigger a system to prevent the entity from acquiring the restricted item. The system may be triggered, for example, by generating a notification on an electronic device 280 associated with an in-store operator. The notification may, for example, indicate a location of the restricted item and/or the entity within the premises. By way of example, the notification may specify an aisle number, region number, shelf number, etc.

In some implementations, triggering a system to prevent the entity from acquiring the restricted item may include controlling an electrically controlled exit prevention device 290 such as an electrically controlled gate or door associated with an exit for the ambient commerce premises to prevent the entity from leaving the ambient commerce premises with the restricted item.

Variations of the method 500 of FIG. 5 are also contemplated. For example, in one possible variation, the operation 580 may not be performed. Instead, the operation 590 may be performed automatically in response to determining that the entity is not eligible at the operation 550.

Figure 7:
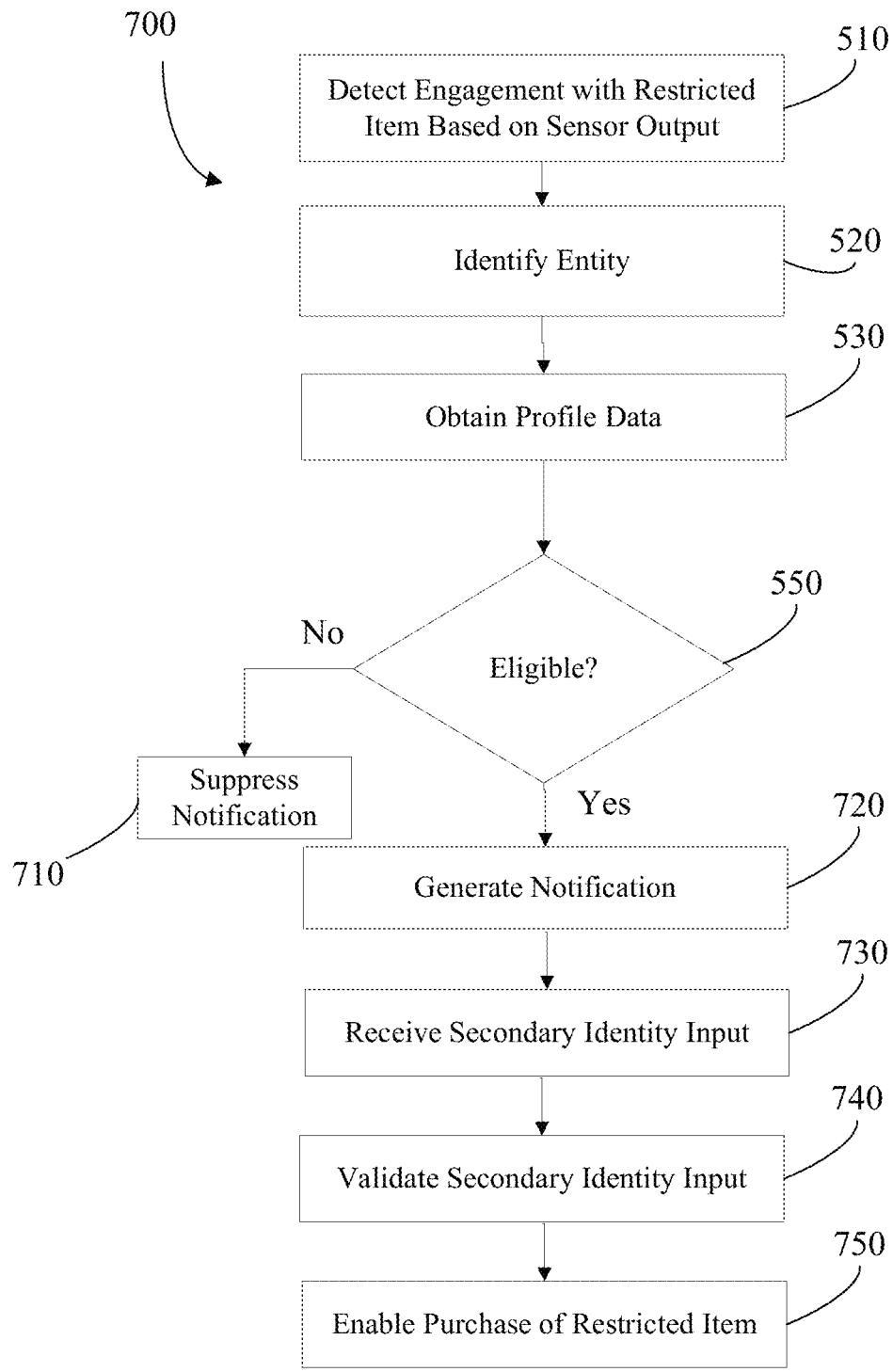
FIG. 7 is a flowchart showing operations performed by a computer system in providing a notification at an electronic device associated with an entity.

A method 700 that includes a further variation is illustrated in FIG. 7. FIG. 7 is a flowchart showing operations performed by a system 200, such as the ambient commerce system 100 (FIGS. 1 and 2) and/or the resource server 210 (FIG. 2). The operations may be included in a method 700 which may be performed by the ambient commerce system 100 (FIGS. 1 and 2) and/or the resource server 210 (FIG. 2). For example, computer-executable instructions stored in memory of the ambient commerce system 100 (FIGS. 1 and 2) and/or the resource server 210 (FIG. 2) may, when executed by one or more processors of the ambient commerce system 100 (FIGS. 1 and 2) and/or the resource server 210 (FIG. 2), configure the ambient commerce system 100 (FIGS. 1 and 2) and/or the resource server 210 (FIG. 2) to perform the method 700 or a portion thereof.

The method 700 of FIG. 7 may include a number of operations in common with the method 500 of FIG. 5 and the description of such operations will not be repeated. For example, the operations 510, 520, 530 and 550 are also included in the method 700 of FIG. 7. That is, the operations of the method 500 up to and including the operation 550 in which the system 200 evaluates whether the entity is eligible for the restricted item that they are engaged with may be repeated in the method 700 of FIG. 7. In contrast to the method 500 of FIG. 5, however, according to the method 700 of FIG. 7 the notification is generated, at an operation 720, in response to determining that the entity is, in fact, eligible. That is, the notification is triggered in response to determining that the entity complies with the restriction.

The notification of the method 700 of FIG. 7 may be provided in a manner that is the same or similar to the manner by which the notification is generated at the operation 570 of the method 500 of FIG. 5. The notification may, for example, be generated on an output interface associated with the electronic device 130 that is associated with the entity. The notification generated at the operation 720 of FIG. 7 may, however, be different in some aspects from the notification generated at the operation 570 of the method 500 of FIG. 5. Specifically, the notification in the operation 720 of the method 700 of FIG. 7 may not indicate that the entity is ineligible. Rather, it may indicate that the entity is eligible.

Figure 8:
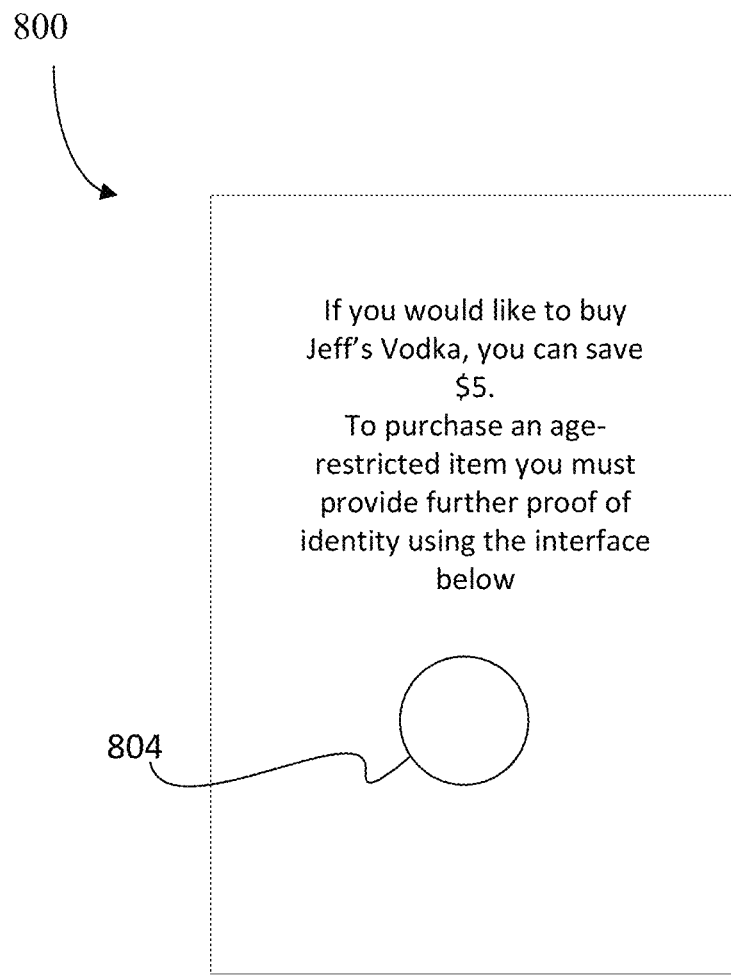
FIG. 8 is an example notification in accordance with example embodiments.

Referring briefly to FIG. 8, an example notification 800 is illustrated. The example notification includes an offer associated with the restricted product. It may be noted that this notification is only generated when the entity is eligible for the age restricted item and, in at least some implementations, when the entity has demonstrated an interest in the restricted item; for example, through engagement with the restricted item. The offer may be or include a discount which will be automatically applied by the ambient-commerce system if the entity purchases the restricted item. The offer may be an offer associated with the restricted item that the entity was engaged with or it may be an offer associated with an alternate restricted item, such as a similar restricted item. By way of example, the offer may be for a different brand of item than the item that the entity was engaged with.

In some implementations, the notification may include a selectable option to accept the offer and in other implementations the offer may be determined to have been implicitly accepted when the entity initiates a checkout process that includes the restricted item. For example, in an ambient commerce system, the checkout process may be initiated when the entity leaves or attempts to leave the ambient commerce premises.

As also illustrated in the example of FIG. 8, the notification may, in some implementations, include a prompt 804 for a secondary identity input. The secondary identity input is input which may be used to verify the identity of the entity. The secondary identity input may be or include, for example, input at a fingerprint reader on the electronic device and/or input at a microphone of the electronic device, and/or input at a keypad or virtual keypad of the electronic device which may be used to input a purported shared secret.

Referring again to FIG. 7, after the notification is generated at the operation 720, the system 200 may receive secondary identity input at an operation 730. The system may then validate the secondary identity input at an operation 740. The secondary identity input may be validated using a variety of techniques. For example, where the secondary identity input represents a fingerprint, the fingerprint may be compared with a stored representation of a fingerprint to confirm a match. Where the secondary identity input represents a voice input, the voice input may be compared with a voiceprint associated with the entity. Where the secondary identity input represents a shared secret, a purported shared secret input at the electronic device may be compared with a stored shared secret to confirm a match.

In at least some implementations, when the identity of the entity is validated, the system 200 may enable the purchase of the restricted item at an operation 750. Enabling the purchase may include controlling an electrically controlled exit prevention device 290 such as an electrically controlled gate or door associated with an exit for the ambient commerce premises to allow the entity to leave the ambient commerce premises with the restricted item.

If, instead at the operation 550 the system determined that the entity is not eligible, then the operation 710 may be performed. At the operation 710, the system may supress the notification. Additionally or alternatively, the system 200 may, upon determining that the entity is not eligible, control an electrically controlled exit prevention device 290, such as an electrically controlled gate or door associated with an exit for the ambient commerce premises, to prevent the entity from leaving the ambient commerce premises with the restricted item.

Variations of the method 700 are also contemplated. For example, in one possible variation, the secondary identity verification operations 730 and 740 may not be performed. Rather, the system may enable the purchase of the restricted item at the operation 750 in response to determining that the entity is eligible for the purchase.

Figure 9:
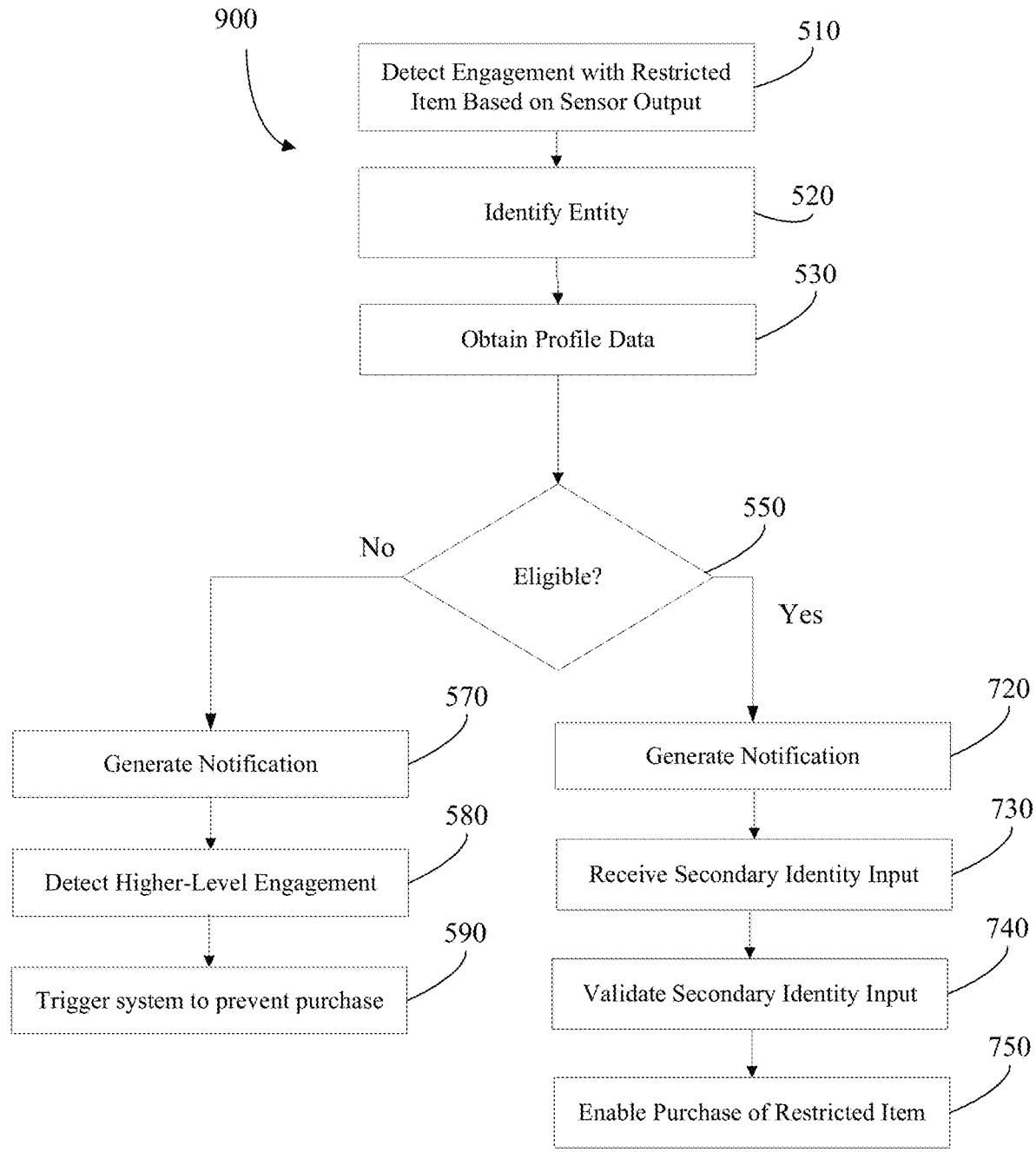
FIG. 9 is a flowchart showing operations performed by a computer system in providing a notification at an electronic device associated with an entity.

Referring now to FIG. 9, a method 900 which is a further variation of the method 500 and 700 will now be described. FIG. 9 is a flowchart showing operations performed by a system 200, such as the ambient commerce system 100 (FIGS. 1 and 2) and/or the resource server 210 (FIG. 2). The operations may be included in a method 900 which may be performed by the ambient commerce system 100 (FIGS. 1 and 2) and/or the resource server 210 (FIG. 2). For example, computer-executable instructions stored in memory of the ambient commerce system 100 (FIGS. 1 and 2) and/or the resource server 210 (FIG. 2) may, when executed by one or more processors of the ambient commerce system 100 (FIGS. 1 and 2) and/or the resource server 210 (FIG. 2), configure the ambient commerce system 100 (FIGS. 1 and 2) and/or the resource server 210 (FIG. 2) to perform the method 900 or a portion thereof.

The method 900 of FIG. 9 may include a number of operations in common with the method 500 of FIG. 5 and the method 700 of FIG. 7. and the description of such operations will not be repeated. For example, the operations 510, 520, 530 and 550 are also included in the method 700 of FIG. 7. That is, the operations of the method 500 up to and including the operation 550 in which the system 200 evaluates whether the entity is eligible for the restricted item that they are engaged with may be repeated in the method 900 of FIG. 9. In contrast to the method 500 of FIG. 5 and the method 700 of FIG. 7, however, according to the method 900 of FIG. 9 a notification may be generated both when it is determined at the operation 550 that the entity is eligible to acquire the restricted item and when it is determined that the entity is not eligible to acquire the restricted item. Such notifications are, however, selectively generated since the notifications are different depending upon whether the entity is or is not eligible. When the entity is not eligible, a notification 600 of the type described above with reference to FIG. 6 may be generated and when the entity is eligible, a notification 800 of the type described above with reference to FIG. 8 may be generated. When the entity is eligible, the notification (generated at the operation 72) may indicate that the entity is eligible. As described above, in such a circumstance, the notification may include an offer and/or a prompt 804 for a secondary identity input. If, however, the entity is not eligible, the notification (generated at the operation 570) may indicate that the entity is not eligible.

One or more of the operations 580 and/or 590 of the method 500 of FIG. 5 may also be repeated in the method 900 of FIG. 9 when it is determined that the entity is not eligible.

Additionally or alternatively, one or more of the operations 730, 740, 750 of the method 700 of FIG. 7 may be repeated in the method 900 of FIG. 9 when it is determined that the entity is eligible.

The methods described above may be modified and/or operations of such methods combined to provide other methods. For example, in some implementations, one of the first predetermined criteria and the second predetermined criteria may not be evaluated in some implementations. By way of example, in one implementation, a notification may be sent even if the first item does not satisfy the first predetermined criteria, provided the resource parameter satisfies the second predetermined criteria. By way of further example, in another implementation, a notification may be sent even if the resource parameter does not satisfy the second predetermined criteria as long as the first item satisfies the first predetermined criteria.

In another possible variation, it may be that the techniques described herein may be applied at systems that do not support ambient commerce. For example, the notification and feature enablement techniques described herein may be used on a system that does not, additionally, provide for a checkout-less experience.

Other variations of the methods 500, 700, 900 described above are also contemplated. For example, in some implementations, when a resource server 210 is engaged by an ambient commerce system 100 to provide profile data for an entity to determine if the entity is eligible for a restricted item, the ambient commerce system 100 may provide the resource server 210 with information about the restriction and the resource server may then determine eligibility and provide the ambient commerce system 100 with a response indicating eligibility. The response may, for example, be a binary response. For example, the resource server 210 may indicate whether the entity is eligible without providing specific biographical data to the ambient commerce system 100. Conveniently, such an implementation may reduce the risk of private data being intercepted during or after such communications.

Any examples involving a general purpose computer, aspects of this application transform the general-purpose computer into a special-purpose computing device when configured to execute the instructions described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. An ambient commerce system comprising:
one or more sensors at an ambient commerce premises, at least one of the one or more sensors being associated with a shopping receptacle and being configured to detect when a restricted item is added to the shopping receptacle, the shopping receptacle being a container configured to transport goods within the ambient commerce premises;
a processor coupled to the one or more sensors; and
a memory coupled to the processor, the memory storing processor-executable instructions which, when executed, cause the processor to:
detect, based on an output from the at least one sensor associated with the shopping receptacle, engagement of an entity with the restricted item when the restricted item is added to the shopping receptacle;
identify the entity;
obtain at least a portion of a profile for the entity;
determine, based on the at least a portion of the profile for the identified entity, eligibility for the entity to acquire the restricted item;
selectively generate, based on the determined eligibility for the entity, a notification on an electronic device associated with the entity; and
lock an electrically controlled exit at the ambient commerce premises when it is determined that the entity is ineligible to purchase the restricted item.

2. The ambient commerce system of claim 1, wherein detecting entity engagement with a restricted item includes detecting a dwell at a region associated with the restricted item.

3. The ambient commerce system of claim 1, wherein detecting entity engagement with a restricted item includes determining that the restricted item has been added to the shopping receptacle associated with the entity.

4. The ambient commerce system of claim 1, wherein selectively generating includes:
when the entity is ineligible to purchase the restricted item, triggering the notification to indicate ineligibility.

5. The ambient commerce system of claim 1, wherein selectively generating includes:
when the entity is eligible to purchase the restricted item, triggering the notification to prompt for a secondary identity input.

6. The ambient commerce system of claim 5, wherein the secondary identity input is input at a fingerprint reader on the electronic device.

7. The ambient commerce system of claim 5, wherein the secondary identity input is a voice input at a microphone of the electronic device and wherein the processor is further configured to compare the voice input to a voiceprint associated with the entity.

8. The ambient commerce system of claim 1, wherein selectively generating includes:
when the entity is eligible to purchase the restricted item, triggering an offer associated with the restricted item.

9. The ambient commerce system of claim 1, wherein the at least a portion of the profile for the entity is obtained from a financial institution system associated with the entity.

10. The ambient commerce system of claim 1, wherein the restricted item is an age-restricted item.

11. The ambient commerce system of claim 1, wherein the memory storing processor-executable instructions, when executed, further cause the processor to:
when the entity is ineligible to purchase the restricted item, trigger the system to prevent the entity from purchasing the restricted item.

12. The ambient commerce system of claim 11, wherein triggering the system to prevent the entity from purchasing the restricted item comprises generating another notification on an electronic device associated with an in-store operator.

13. A computer-implemented method comprising:
detecting, based on output from at least one sensor at an ambient commerce premises, the at least one sensor being associated with a shopping receptacle at the ambient commerce premises, engagement of an entity with a restricted item when the restricted item is added to the shopping receptacle, the shopping receptacle being a container configured to transport goods within the ambient commerce premises, and the at least one sensor being configured to detect when the restricted item is added to the shopping receptacle;
identifying the entity;
obtaining at least a portion of a profile for the entity;
determining, based on the at least a portion of the profile for the identified entity, eligibility for the entity to acquire the restricted item;
selectively generating, based on the determined eligibility for the entity, a notification on an electronic device associated with the entity; and
locking an electrically controlled exit at the ambient commerce premises when it is determined that the entity is ineligible to purchase the restricted item.

14. The method of claim 13, wherein detecting entity engagement with a restricted item includes detecting a dwell at a region associated with the restricted item.

15. The method of claim 13, wherein detecting entity engagement with a restricted item includes determining that the restricted item has been added to the shopping receptacle associated with the entity.

16. The method of claim 13, wherein selectively generating includes:
when the entity is ineligible to purchase the restricted item, triggering the notification to indicate ineligibility.

17. The method of claim 13, wherein selectively generating includes:
when the entity is eligible to purchase the restricted item, triggering the notification to prompt for a secondary identity input.

18. The method of claim 17, wherein the secondary identity input is input at a fingerprint reader on the electronic device.

19. The method of claim 17, wherein the secondary identity input is a voice input at a microphone of the electronic device and the method further includes comparing the voice input to a voiceprint associated with the entity.

20. The method of claim 13, wherein selectively generating includes:
when the entity is eligible to purchase the restricted item, triggering an offer associated with the restricted item.

21. The method of claim 13, wherein the at least a portion of the profile for the entity is obtained from a financial institution system associated with the entity.

22. The method of claim 13, wherein the restricted item is an age-restricted item.

* * * * *